Nov. 8, 1949     W. BRIDEGROOM     2,487,305
LOADING HOIST
Filed May 16, 1947
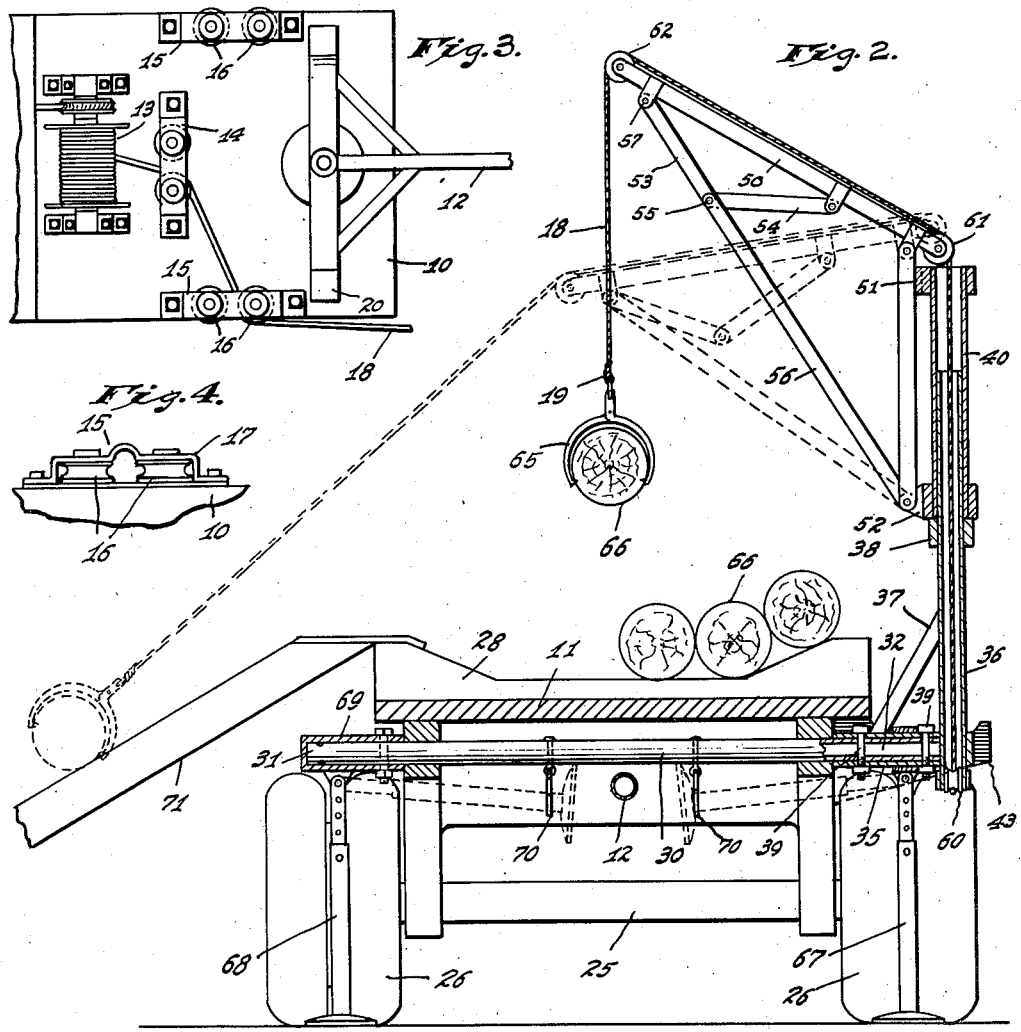
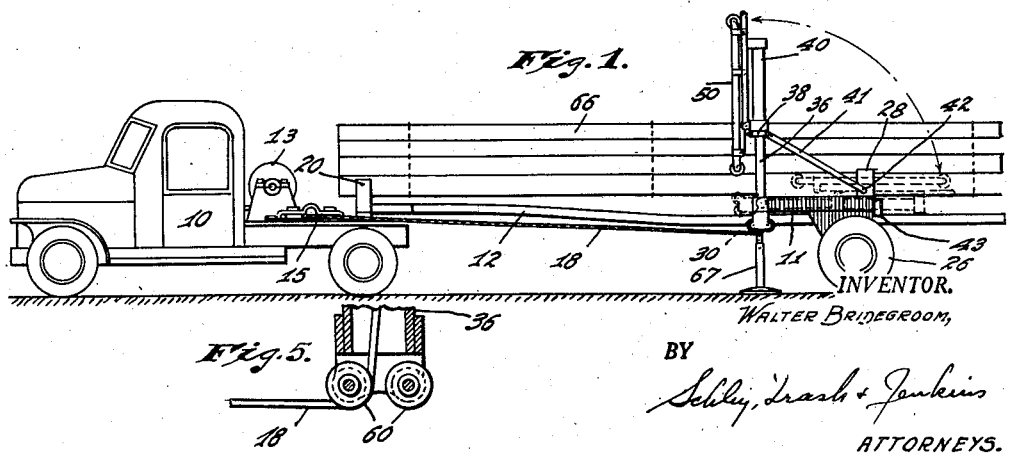
INVENTOR.
WALTER BRIDEGROOM,
BY
ATTORNEYS.

Patented Nov. 8, 1949

2,487,305

UNITED STATES PATENT OFFICE 2,487,305

LOADING HOIST

Walter Bridegroom, Muncie, Ind., assignor to Superior Tree Expert Co., Inc., Muncie, Ind., a corporation of Indiana Application May 16, 1947, Serial No. 748,503

4 Claims. (Cl. 212—145)

This invention relates to a hoist, and to the combination thereof with a trailer adapted to carry large pipes or poles such as utility poles.

Utility poles, and similar objects of considerable length and weight, such as sections of heavy pipe, are commonly transported by a truck and trailer combination in which the front ends of the poles or similar objects are supported on a bolster on the truck while the rear ends of the poles are carried by a two-wheeled trailer towed by the truck. Such truck-trailer combinations are commonly loaded by sliding or rolling the poles up a pair of inclined skids whose upper ends are supported on the bolsters and whose lower ends rest on the ground. The truck is commonly equipped with a winch, and this may be used in dragging the poles up the skids; but even with the assistance of skids and a winch, the loading and unloading of such carriers requires considerable manual labor. Moreover, once the poles have been dragged up the skids, much labor is still required to move them about on the carrier to a proper load position.

It is the object of my invention to provide a relatively simple hoist which may be carried by the trailer and which will greatly facilitate the work of loading and unloading such articles as poles from a carrier of the type described, and which may be operated by the winch of the truck. It is a further object of my invention to provide such a hoist which may be readily attached and detached from the carrier; which may be mounted on either side of the carrier; which may be readily adjusted between elevated and lowered operating positions and to a folded position for travel along the highway; which will greatly facilitate movement of poles up the skids and will lift poles over the carrier bed to facilitate their proper placement thereon, and which in elevated position will be adapted to lift poles off a railroad car or rack and deposit them in proper loaded position on the carrier.

In accordance with my invention, the trailer is provided at the front with a transverse supporting member, conveniently tubular, which has outwardly projecting free ends, to provide alternative mounts for the hoist at opposite sides of the carrier. The hoist is carried by a fitting which may be removably mounted on either end of this transverse cross member. Such fitting carries an upright post, which is suitably braced from the inner end of the fitting and from an anchor point adjacent the rear of the trailer, and which provides at its upper end a vertical tubular bearing. The boom of the hoist is carried by a tubular sleeve which is mounted on the bearing, and such boom is braced from the lower end of the sleeve by readily releasable linkage which may be connected in one arrangement to hold the boom in elevated position and in another arrangement to hold the boom in a lowered position. The hoist cable extends from the winch on the truck to the bottom of the supporting post for the hoist, thence up through such post and through the boom-supporting sleeve, and thence over pulleys on the boom. The front of the trailer may carry supplemental outrigger supports, and I preferably mount one such outrigger on the hoist-supporting fitting and another on a fitting which is received on the alternative hoist support at the opposite end of the tubular cross member on the trailer. Desirably, the side of the trailer is provided with a suitable cradle, so that by releasing the brace which supports the hoist against rotation about the transverse mounting member, the hoist may be rotated about that member into a folded carrying position in such cradle.

The accompanying drawing illustrates the invention. In such drawing Fig. 1 is a side elevation of a carrier embodying my invention; Fig. 2 is a front elevation of the trailer shown in Fig. 1, with portions of the hoist shown in section; Fig. 3 is a plan of the load platform of the truck shown in Fig. 1; Fig. 4 is a fragmental side elevation of such platform, showing details of a double sheave with which it is provided; and Fig. 5 is a fragmental section of the lower end of the hoist shown in Fig. 1.

In describing the embodiment of my invention shown in the drawing, I shall refer to the load as poles. But the invention, and the particular embodiment shown, is not limited to the carrying of poles, but may be used with other similar articles, such as sections of heavy pipe.

In the device shown, the carrier comprises a truck 10 and a trailer 11. The truck carries a swivelled bolster 20 fixed to the front end of an extensible tongue 12 by which the trailer is towed. The truck carries a winch 13, a double sheave 14 immediately behind the winch 13 and double sheaves 15 at the opposite sides of the truck, through which the winch cable 18 may be strung to lead rearward along either side of the truck. As shown in Fig. 4, each of the double sheaves 15 consists of a pair of pulleys 16 on vertical axes, secured by an upper plate 17. The pulleys 16 are sufficiently spaced, and the cover plate 17 is sufficiently raised over the space between the pulleys 16, to provide clearance to pass the eye 19 secured at the end of the cable 18.

The trailer comprises an axle 25 supported on wheels 26, on which suitable body structure is provided to support one or more bolsters 28. Across the front of the trailer 11 there is a transverse hoist supporting member 30, conveniently in the form of a tube, and supported in any suitable manner to leave its ends 31 and 32 projecting freely outward from the sides of the trailer body to form alternative mounts for the hoist. The hoist is supported on the trailer by a fitting 35 conveniently in the form of a sleeve received on the end 32 of the transverse supporting member 30 and secured thereon by pins or bolts 39. The fitting 35 carries a post 36, braced to the inner end of the fitting 35 by a brace 37. At a point below its upper end, the post 36 carries a fixed collar 38, and the upper end of the post 36 is received within a sleeve 40, which rests on the collar 38 and is rotatable about the axis of the post 36.

The boom 50 of the hoist is pivotally mounted on a bracket 51 carried at the upper end of the sleeve 40; and is braced from a bracket 52 at the bottom of the sleeve 40, by linkage which provides at least two boom positions. Conveniently, such linkage comprises a pair of links 53 and 54 pivoted to the boom near its ends, and adapted to be pinned to each other at a linkage point 55, to form a triangle with the boom 50. A brace 56 is pivoted to the bracket 52 and is connected to the linkage point 55 to support the boom 50 in elevated position, as shown in full lines in Fig. 2. To lower the boom, the link 56 is disconnected from the linkage point 55 and is connected directly to the boom, near its outer end, as at the point 57. The connections of the brace 56 at the linkage points 55 and 57 is desirably by pins, held by suitable keepers, and are readily releasable so that the boom may be changed readily from one position to the other as may be desired. The raised position of the boom 50 will normally be used when the poles are lifted in loading the carrier, and the boom will desirably be moved to its lowered position when the loading is by dragging the poles up skids, or to provide a lower clearance when the carrier is moving over the highway.

As may be seen in Fig. 1, the hoist post 36 is braced in a longitudinal vertical plane by a brace 41 extending from the collar 38 rearward and downward to an anchor point 42 on the frame of the trailer. This brace 41 is readily releasable, and the trailer frame is provided with an outward projecting hook or cradle 43; so that by releasing the brace 41, the hoist (supporting fitting 35 and the post 36 with the boom 50 and its supporting structure) may be rotated about the axis of the transverse tube 30 to lower the hoist to a horizontal position with its sleeve 40 resting in the cradle 43, as shown in dotted lines in Fig. 1. In such case the supporting links and braces for the boom 50 may be released and they and the boom 50 folded down against the post 36 and sleeve 40.

The hoist cable is conveniently the cable 18 of the winch 13. Such cable 18 extends from the winch 13 first through the double sheave 14, then through the double sheave 15, then rearward to the bottom of the hoist post 36. The bottom of such post 36 is provided with a pair of pulleys 60, on axes parallel to the axis of the mounting tube 30. Such pulleys are desirably spaced apart a sufficient distance to pass the eye of the cable. The cable engages the front pulley 60, then extends up through the post 36 and through the sleeve 40 to a pulley 61 mounted at the rear end of the boom 50, and thence along the boom 50 and over a pulley 62 at its end. The free end of the cable 18 is formed with an eye 19, which is connected to suitable thongs 65 or other gripping device for the poles 66 to be loaded.

Desirably, supplemental outrigger supports 67 and 68 are provided at the front of the trailer to stabilize it during operation of the hoist. These may be mounted on the trailer independently of the hoist supporting mechanism, but I prefer to pivot the outrigger 67 to a bracket on the fitting 35 which supports the hoist post 36. In such case, the outrigger support 68 is pivoted to a sleeve 69 received on alternative hoist mount at the opposite end of the transverse mounted tube 30 from the hoist. During operation of the hoist such outriggers are lowered into engagement with the ground, and when not needed, they are swung about their pivots and secured in raised position in any suitable manner, as by a chain or by hooks 70 supported from the transverse mounting tube 30.

As shown, the hoist is mounted on the right side of the trailer, on the right end 32 of the cross member 30 as seen in Fig. 2, and the supplemental outrigger 68 is mounted on the left end 3 at the left side of the trailer. If desired, the hoist may be mounted on the opposite side of the trailer, merely by removing the bolts 39 by which the fitting 35 is secured to the transverse supporting tube 30, and sliding the fitting 35 off the end 32 of that tube, and remounting it on the other end 31 of the tube. The outrigger 68 will also be removed from the position shown in Fig. 2, and mounted on the opposite end of the supporting tube 30. When the hoist is so mounted on the opposite side of the trailer from that shown in Fig. 2, the cable 18 will extend from the winch 13, through the double sheave 15 at that same side of the truck (at the top in Fig. 3), thence rearward to the frontmost pulley 60, and thence upward through the hoist post as before.

The hoist has been found to be highly adaptable in use to meet many requirements and to reduce greatly the manual labor required. For example, with the parts arranged as shown in full lines in Fig. 2, the boom may be swiveled around to the right and the cable lowered to pick up poles from the ground and to lift them. When the lifted pole reaches a level above the load, the pole 66 and boom are swung around to the position shown in full lines in Fig. 2, and the pole 66, is then lowered and guided into proper position on the load. One man can readily manipulate the pole in this operation, to guide it to the desired position in the load.

In this same way, poles may be loaded from a railroad car directly onto the truck carrier, without the usual process of spilling them all onto the ground and then dragging them up skids to the carrier. Likewise, poles may be loaded directly from a crib or stack.

In addition, the hoist may be used to load from the ground, with skids 71, as when the poles are scattered and must be dragged to the carrier. In such case, the hoist may be arranged as shown in dotted lines in Fig. 2, and the poles dragged up skids 71.

I claim as my invention:

1. In combination with a carrier for poles and the like which includes a truck and trailer towed thereby, a hoist supporting member projecting from said trailer, a hoist supporting fitting mounted on the projecting end of said member, an upright post carried by said fitting, a boom support swiveled on said post, a boom pivoted on said swiveled support, a brace pivoted to said swiveled support at a point spaced below said boom pivot and arranged to be connected to support said boom in two angles of vertical adjustment, a winch on said truck, and a cable extending from said winch to the bottom of said hoist post and thence upward and over said boom.

2. The combination as defined in claim 1, with the addition of a ground-engaging member connected to support said hoist-mounting fitting and movable between a ground-engaging position and an elevated position.

3. The combination as defined in claim 1, in which there is a hoist-supporting member projecting from each side of the trailer, with the additiona of a ground-engaging member connected to support said hoist-mounting fitting, and a second ground-engaging member carried by fitting on the hoist-supporting member projecting from the opposite side of the trailer.

4. The combination as defined in claim 1 in which said projecting hoist-supporting member is tubular and said fitting includes a sleeve received on said tubular member, with the addition of a cradle member carried by the trailer in position to support the hoist when it is rotated about the tubular supporting member to a lowered position.

WALTER BRIDEGROOM.

REFERENCES CITED

The following references are of record in the file of this patent:

UNITED STATES PATENTS

| Number | Name | Date |
|---|---|---|
| 708,045 | Houdyshell | Sept. 2, 1902 |
| 1,340,893 | Haas | May 25, 1920 |
| 1,411,829 | Atkinson | Apr. 4, 1922 |
| 1,782,607 | Freeman | Nov. 25, 1930 |
| 2,073,563 | Phillips | Mar. 9, 1937 |
| 2,082,017 | McClain | June 1, 1937 |
| 2,088,828 | Winston | Aug. 3, 1937 |
| 2,445,614 | Flynn et al. | July 20, 1948 |